May 30, 1939.  I. F. McDONALD  2,160,783
MACHINE FOR MAKING PIES, TURNOVERS, AND THE LIKE
Original Filed Dec. 27, 1932  5 Sheets-Sheet 1
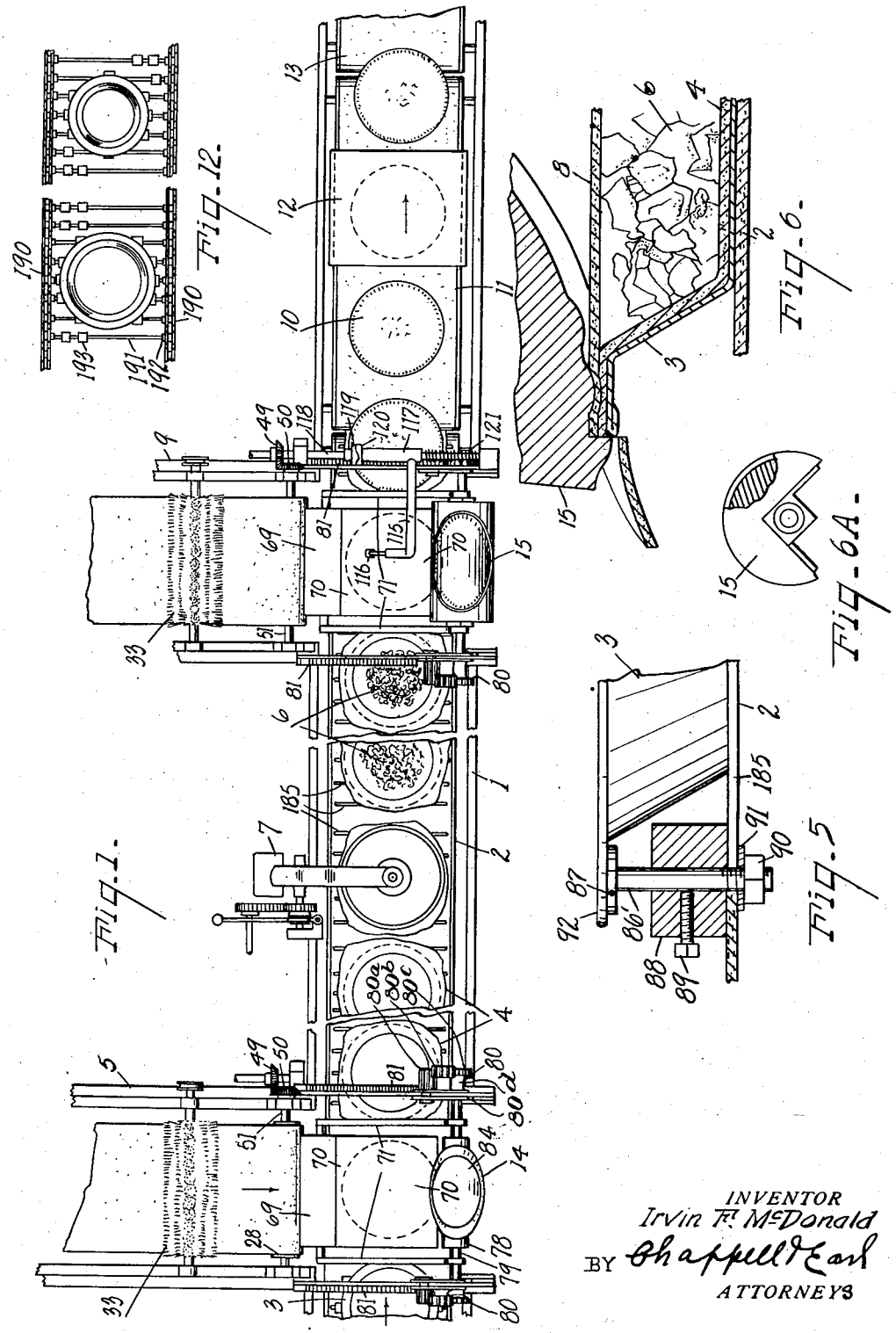
INVENTOR
Irvin F. McDonald
BY Chappell & Earl
ATTORNEYS

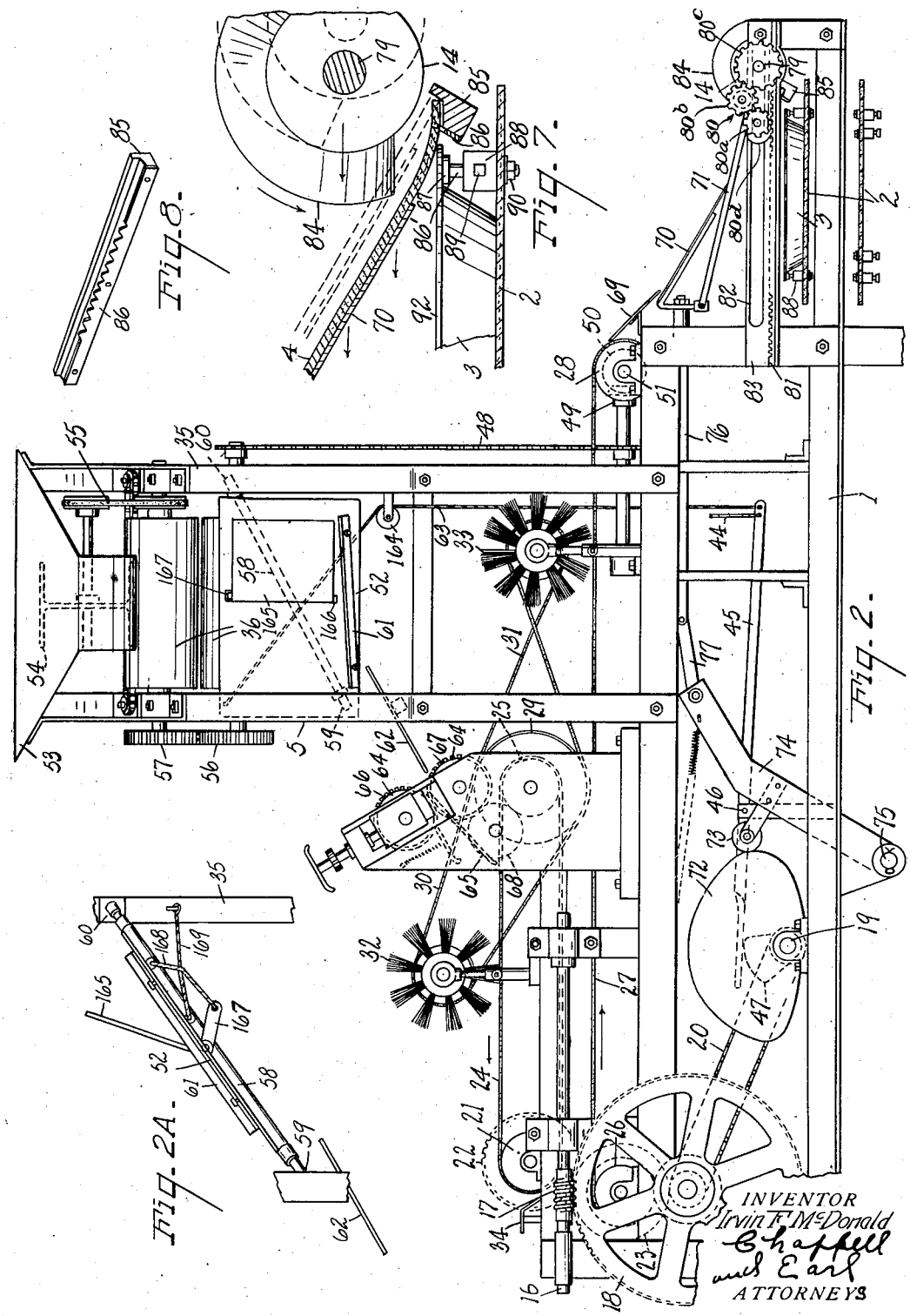

May 30, 1939.   I. F. McDONALD   2,160,783
MACHINE FOR MAKING PIES, TURNOVERS, AND THE LIKE
Original Filed Dec. 27, 1932   5 Sheets-Sheet 3
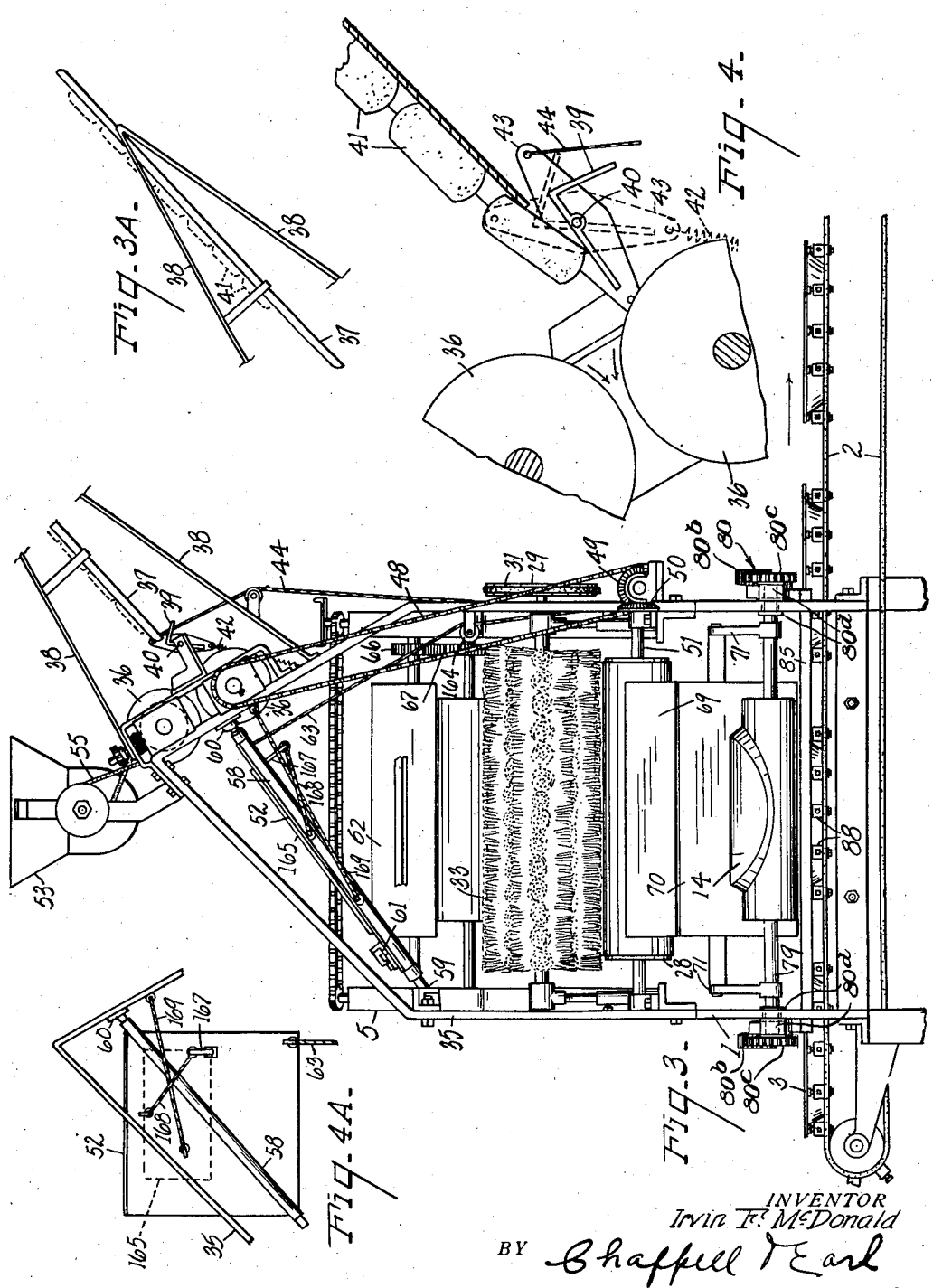
INVENTOR
Irvin F. McDonald
BY Chappell & Earl
ATTORNEYS May 30, 1939.   I. F. McDONALD   2,160,783
MACHINE FOR MAKING PIES, TURNOVERS, AND THE LIKE
Original Filed Dec. 27, 1932   5 Sheets-Sheet 4

INVENTOR
Irvin F. McDonald
BY Chappell & Earl
ATTORNEYS

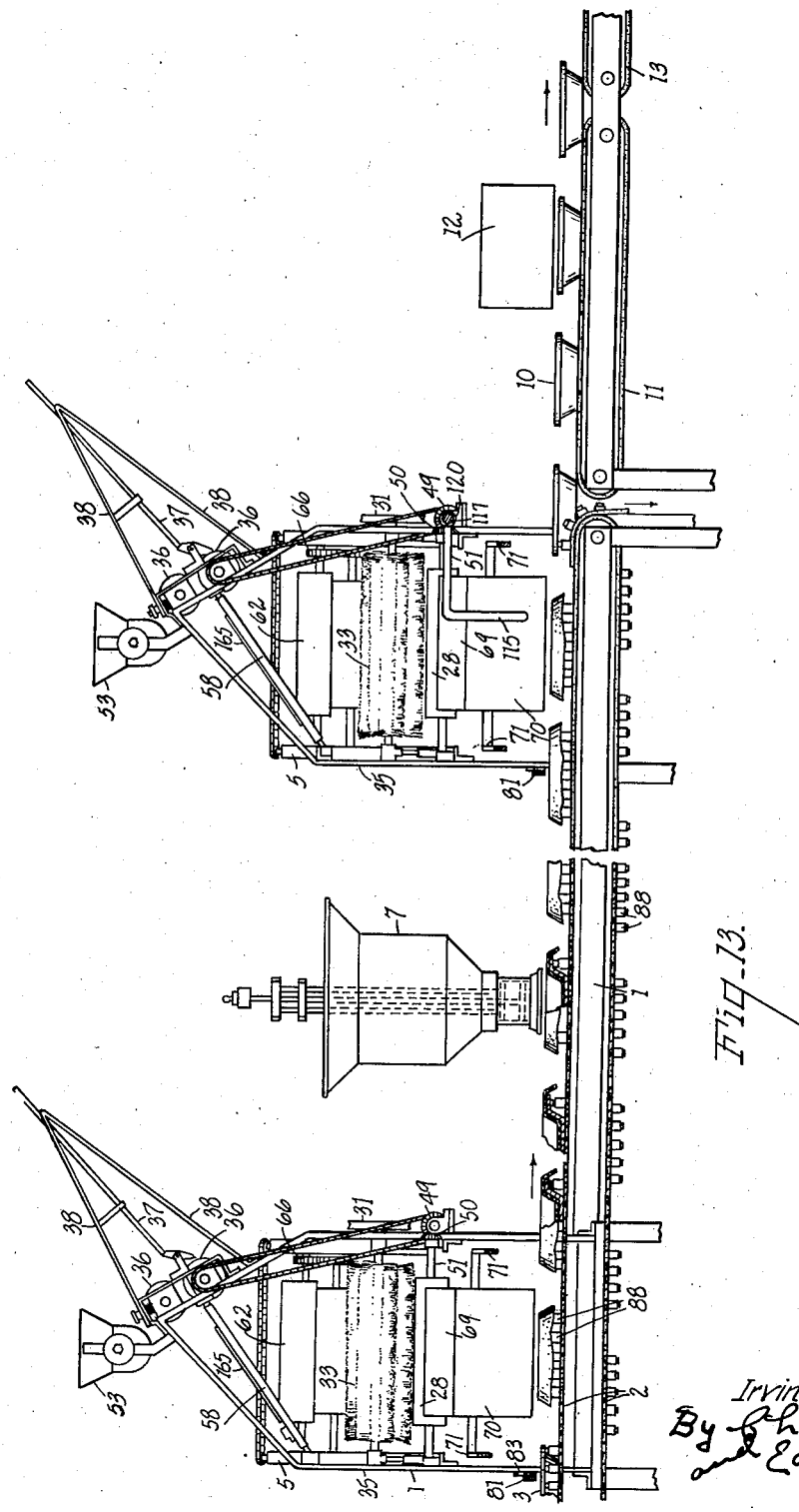

Patented May 30, 1939

2,160,783

UNITED STATES PATENT OFFICE 2,160,783

MACHINE FOR MAKING PIES, TURNOVERS AND THE LIKE

Irvin F. McDonald, Los Angeles, Calif.

Application December 27, 1932, Serial No. 649,004
Renewed July 31, 1934

24 Claims. (Cl. 107—1)

The main objects of this invention are:

First, to provide an improved machine for making pies, turnovers, and the like.

Second, to provide an improved dough feeder in a machine of this character.

Third, to provide an improved release for the dough feeder.

Fourth, to provide improved means for rolling a piece of dough, first in one direction, and then in a direction at right angles thereto.

Fifth, to provide a transfer table for receiving the dough after being rolled in one direction and delivering it by gravity for rolling in a direction normal thereto.

Sixth, to provide improved mechanism for laying and pressing a sheet of dough into a pie plate.

Seventh, to provide a conveyor having adjustable supports engaging the rim of the plate for preventing tipping and sliding of the plate during the dough laying and pressing operations.

Eighth, to provide improved means for laying, trimming, and crimping a top on a filled pie.

Ninth, to provide spaced conveyors for discharging the trimmings therebetween.

Tenth, to provide a rotary cutting and crimping device of improved construction.

Eleventh, to provide a dough pressing roll of improved construction.

Twelfth, to provide a machine for making pies and/or turnovers and the like, which is simple and economical in its parts and automatic and efficient in operation.

This application is a continuation in part of my copending application for Letters Patent, Serial No. 587,328, filed January 18, 1932, for Cooking machine.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary top plan view of a machine embodying features of my invention.

Fig. 2 is an enlarged fragmentary view in side elevation.

Fig. 2A shows the table in tipped position.

Fig. 3 is an enlarged fragmentary view in end elevation.

Fig. 3A is the upper portion of the dough feeder.

Fig. 4 is an enlarged fragmentary detail in section of dough release and feeding mechanism.

Fig. 4A is a rear view of the table in tipped position.

Fig. 5 is an enlarged fragmentary section of the conveyor.

Fig. 6 is an enlarged fragmentary section illustrating the operation of the trimming and crimping device.

Fig. 6A is a detail of the crimping roll.

Fig. 7 is a detail section showing the action of the pressing roll and dough engaging dog.

Fig. 8 is a perspective view of the dough engaging dog.

Fig. 12 is a fragmentary top plan view of a conveyor modification.

Fig. 13 is a longitudinal sectional view of the machine along conveyors 2, 11 and 13.

Figures 9, 10, 11:
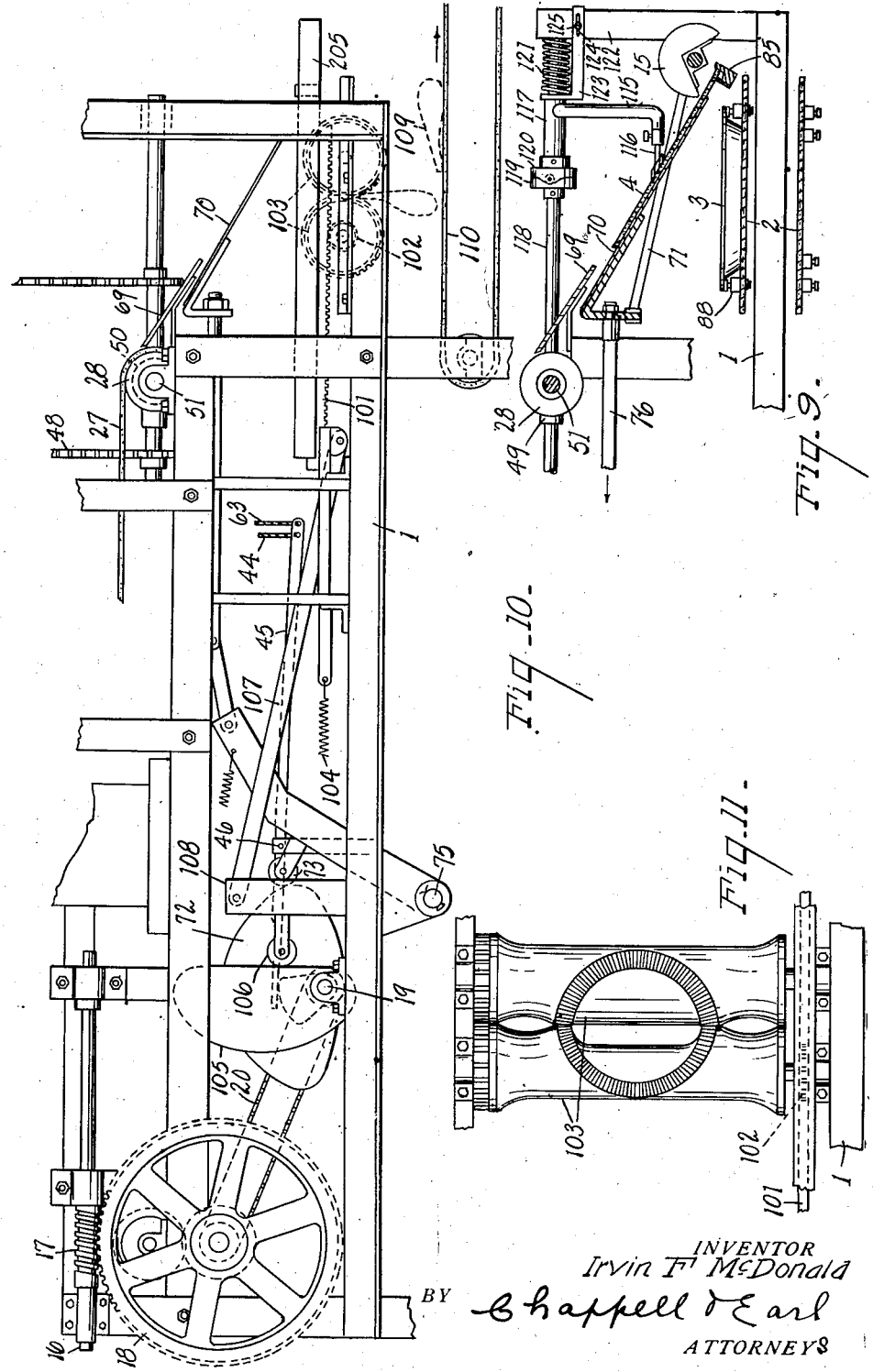
Fig. 9 is a fragmentary side elevation of the marker.
Fig. 10 is a fragmentary view in side elevation of a modification for making turnovers.
Fig. 11 is a fragmentary top plan view of the turnover forming rolls.

Referring to the drawings, 1 is a frame which supports the moving and stationary parts of the machine. The endless conveyor belt 2 is supported and driven by suitable end rolls and is adapted to support the pie tins or plates 3 in spaced relation while being filled with a bottom sheet or crust 4 of dough by the unit 5, filling 6 by the unit 7, and a top or cover sheet or crust 8 of dough by the unit 9. The finished pies 10 are discharged from the conveyor 2 and received by the conveyor 11 which passes the finished pies through the spraying booth 12 and discharges them onto the conveyor 13 leading to the oven or as may be desired. The conveyors are arranged in horizontal alinement and in spaced relation so that the dough trimmings are discharged from the first conveyor therebetween.

The dough conditioning and sheet forming units 5 and 9 are substantially identical, with the exception of the soft rolls 14 and 15, respectively, which will be hereafter explained in detail. The roller 14 is made of soft sponge rubber. The unit 5 is illustrated in Fig. 2 and comprises a power shaft 16 which is connected to any suitable source of power, such as an electric motor (not shown). The power shaft 16 carries a worm 17 which drives the large gear wheel 18, the latter in turn rotating the cam shaft 19 through the belt 20 and the conveyor roll 21 through the gears 22 and 23. An endless conveyor belt 24 is supported by the roll 21 at one end and by the roll 25 at the other end and is driven in the direction of the arrow. The intermediate gear 23 is connected to the end roll 26 of the endless conveyor belt 27 which is arranged under the conveyor 24 and is supported at its forward end by the roll 28. The upper reach of the conveyor 27 travels toward the front of the unit, as illustrated by the arrow.

The shaft of the roll 25 is provided with a pulley 29 for driving the belts 30 and 31 which are connected respectively to the rotary brushes 32 and 33. The brushes are arranged to sweep excess flour from the dough blanks as they are advanced by the conveyors 24 and 27. In passing from the upper conveyor to the lower conveyor, the dough blanks are inverted by the inclined guide 34 which is arranged so as to direct the blanks onto the lower conveyor. Thus, excess flour is brushed from both sides of the dough.

An upright frame 35 is mounted on the frame 1 and is provided at its top with a pair of transverse dough flattening rolls 36, 36 and an inclined feed chute 37 (see Figs. 3 and 3A). The feed chute is supported by suitable struts or braces 38 which are connected to the frame 35. At its lower end, the feed chute is provided with a gate 39 in the form of a plate of L-section pivoted at 40. The gate is inverted and is arranged in its normal position to project upwardly into the path of the lumps 41 of dough in the chute 37. The gate is resiliently held in its closed position by the tension spring 42, the end of the spring being connected to the arm 43 which is connected to the pivot of the gate. The opposite end of the arm 43 is connected by means of the flexible cord 44 to the lever 45 which is pivoted at 46. The lever 45 is actuated by the cam 47 on the cam shaft 19 to release the lumps of dough in timed sequence with the other moving parts of the machine. When the gate or release 39 is tripped, the lump of dough slides down it, as illustrated by Fig. 4, and is directed between the rolls 36 which are rotated in the direction of the arrows by means of chain belt 48 and bevel gears 49 and 50, the latter being connected to the shaft 51 of the conveyor drive roll 28.

The rolls 36 flatten the lump of dough in one direction and deliver it to the inclined chute or table 52. Fresh flour is sifted onto the inclined table 52 and the dough by the flour hopper 53, the flour being agitated by the agitator 54 which is connected to the upper flattening roll by means of belt 55 and suitable pulleys, the flattening rolls 36 being geared together by means of gears 56 and 57. The table 52 is carried by the diagonally disposed shaft 58 which is journaled to the frame at 59 and 60. Near its lower edge, the table is provided with an adjustable stop 61 for limiting the downward movement of the flattened pieces of dough as they are delivered thereto by the flattening rolls 36. The table is tilted to deliver the dough to the inclined guide 62 by means of the cable 63 which passes over the idler wheel 164 and is connected at its lower end to the lever 45.

The table is provided with a plate 165 on its face for lifting the rear portion of the dough blank on the tilting of the table to start the blank on its downward course. The plate is pivoted to the table at 166 and has a crank 167 projecting below the table. The crank is turned so as to lift the plate on the tilting of the table by a pair of flexible wire cables 168 and 169. The wire 168 is connected at one end to the table and at the other end to the crank. The wire 169 is connected at one end to the frame and at the other end to the half of the table which is elevated on the tilting thereof. The wire 169 passes over the wire 168 in such manner that as the angle of the latter is changed by the tilting of the table it engages and bends the wire 168, causing the crank to turn and lift the plate above the face of the table. In returning to its initial position, the table causes these forces to subside and the plate returns to the face of the table by gravity.

The guide 62 directs the partially flattened dough between the flattening rolls 64, 64 which discharge onto the conveyor 24 by way of the inclined chute 65. The flattening rolls 64 are connected by means of the gears 66 and 67, the gear 67 being driven by the roll 25 through gear 68. The rolls 64 are arranged at right angles to the rolls 36 so that each piece of dough is first rolled in one direction and then in a direction at right angles thereto, the table 52 acting to change the direction of movement of each piece of dough as it moves from the first to the second pair of rolls. The rolled pieces of dough are conveyed to the rear of the unit by the feed conveyor 24 and delivered to the forming conveyor 27 in inverted position, as explained above.

At its front end, the unit is provided with an inclined guide 69 for directing the sheets from the end of the conveyor 27 to the inclined plate 70 which is carried by the reciprocating carriage 71. The carriage is advanced by the cam 72 on the cam shaft 19, the cam coacting with a cam follower 73 carried by the arm 74 which is pivoted at 75. The carriage is retracted by the tension spring 176. The arm 74 is connected to the carriage by means of slide 76 and link 77. At its forward end, the carriage is provided with the pressing roll 14 having a shaft 79 provided at its ends with gear mechanisms 80 which coact with the stationary racks 81 to rotate the pressing roll on the advance and retraction strokes of the carriage. The shaft 79 extends through the longitudinal slot 82 in the way member 83. The pressing roll is provided with a projecting portion 84 for coaction with the dough sheet 4 to press it into engagement with the rim, inner wall, and bottom of the pie tin.

Each gear mechanism consists of a long pinion 80ª, meshing at one end directly with the rack 81, an idler pinion 80ᵇ, meshing with the outer end of the pinion 80ª, a larger gear 80ᶜ mounted on the end of the shaft 79 and meshing with the pinion 80ᵇ, both pinions and gear being carried on a slide 80ᵈ reciprocally mounted in the slot 82. As the slides 80ᵈ are reciprocated, the pressing roll 14 is rotated, the surface speed of the roll being approximately the speed of the movement of the slides.

A cross piece 85 having a toothed dog 86 thereon is arranged in the downward path of the dough sheet and constitutes a stop for limiting its downward movement and a keeper for preventing it from following the plate 70 when the latter is moved rearwardly. In its rearward movement, the inclined plate 70 slides from under the sheet 4 of dough, thereby laying or depositing it in the pie tin 3 which has previously been properly positioned by the conveyor 2. The pressing roll follows the rearward movement of the plate and at the same time engages the dough and presses it firmly into engagement with the interior of the tin. In returning, the inclined plate 70 receives a new sheet of dough from the conveyor 27 by way of the guide 69. The conveyor 2 thereupon advances a new pie tin in position under the plate 70.

The conveyor 2 is provided with a plurality of spaced longitudinal slots 185 in which are mounted for longitudinal adjustment the pie plate rim supporting studs 86', the latter terminating at the top in flat heads 87. The supports extend through collars 88 provided with set screws 89 coacting with the supports for securing them in adjusted vertical position for pie plates of varying depth. Threaded to the lower ends of the supports are nuts 90 which are separated from the conveyor 2 by washers 91 by means of which the supports may be secured in any adjusted position longitudinally of the slots 85. The supports 86' engage the rim 92 of the pie tin 3 and also the side wall thereof to prevent the tin from sliding or tipping during the process of laying and pressing the dough sheet into the tin.

After leaving the unit 5, the open pies pass under the filling hopper unit 7 which deposits in each pie a predetermined quantity of filling 6. The hopper unit is connected to the shaft 51 through suitable gears, whereby it is actuated in synchronism with the movement of the conveyor 2.

After leaving the filling hopper unit 7, the conveyor 2 carries the filled pies into position under the inclined plate 70 of the unit 9 which is exactly similar to the unit 5, with the exception that the roll 15 is adapted to cut or trim the pie and crimp the top 8 into engagement with the bottom sheet 4 simultaneously. Fig. 6 illustrates the operation of the crimping and trimming device. The trimmings are discharged in the space provided therefor between the conveyors 2 and 11, as pointed out above.

Associated with the top crust laying device is a marker 115, Fig. 9, for identifying the pies by a symbol, such as an "A" for apple, and the like. The marker comprises a type 116 and a slide 117 on the shaft extension 118 which is driven by the roll 28. A cam member 119 is fixed to the shaft for coaction with the cam member 120 fixed to the slide, so that the rotation of the shaft reciprocates the slide, the latter being urged to cam closing position by the compression spring 121. The spring is disposed on the shaft between the slide and the frame member 122 to which the shaft is journaled. An arm 123 is fixed to the slide for reciprocation therewith and has a slot 124 coacting with the fixed stud 125. The type 116 marks the dough blank 4 just before the latter is laid on the top of the filled pie.

Referring to Figs. 10 and 11, which illustrate an embodiment of my improvements for making turnovers, the rack 101 coacts with the ratchet 102 connected to one of the turnover folding rolls 103 for rotating the latter in one direction when the rack is advanced. The rack is urged to its retracted position by the tension spring 104, a cam 105 being provided on the cam shaft 19 and coacting with the cam follower 106 for reciprocating the rack through the link 107 and pivoted arm 108. The rack 101 is independent of the carriage 71 and is actuated by the cam 105 on shaft 19 as shown in Fig. 9, and slides in guide 205 which is fastened to the frame. The rolls 103 make one complete revolution. Ratchet 102 permits the rack to return without revolving the rolls. On the retraction of the carriage, the plate 70 lays a sheet of dough to form the turnover on the folding rolls 103. While in the flat, filling is deposited on the sheet of dough, and on the advance stroke of the carriage the rolls 103 fold the sheet over the material to crimp the edges thereof together and trim the turnover simultaneously, the turnovers 109 then being discharged onto the endless conveyor belt 110 which is disposed below the rolls 103. The rolls 103 are cut away in the middle, as shown in Fig. 11, and at the ends to accommodate the trimmings.

The conveyor in the modification, Fig. 12, consists of two chains 190, 190 connected by rods 191 and attachment links 192 with slidable blocks 193 mounted on the rods. The blocks support the tins on the under side of the rim and are adjustable to carry tins of different diameters.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a machine of the class described, a reciprocatory carriage having an inclined member and a roll journaled thereon, means for rotating the roll on the reciprocation of said carriage, and means for successively delivering a sheet of dough to said member at each stroke thereof in one direction, said member moving over receptacles successively positioned under said member, whereby a sheet of dough is adapted to be laid on one of said receptacles by the movement of said member in the opposite direction, the roll acting to press the sheet into said receptacle, said roll having a raised portion coacting with the interior of the receptacle to conform the sheet to the shape thereof.

2. In a machine of the class described, in combination, a pair of dough flattening rolls, feeding means for delivering pieces of dough to said rolls in timed sequence, a second pair of dough flattening rolls arranged below and at right angles to said first named rolls, a transfer table inclined relative to said first named rolls for receiving the dough therefrom by gravity, pivot means supporting said table, whereby the tilting thereof inclines the table toward said second rolls causing the dough to be delivered thereto by gravity, and means for actuating said feeding means and tilting said table in synchronism with each other.

3. In a machine of the class described, the combination with a conveyor for carrying a dish, of a carriage mounted to reciprocate transversely of said conveyor and provided with an inclined table, means for feeding sheets of dough to said inclined table, and means disposed at the side of the conveyor adapted to retain the sheet of dough as the table is retracted whereby it is deposited upon the dish.

4. In a machine of the class described, the combination with a conveyor for carrying a dish, of a carriage mounted to reciprocate transversely of said conveyor and provided with an inclined table, means for feeding sheets of dough to said inclined table, means disposed at the side of the conveyor adapted to retain the sheet of dough as the table is retracted whereby it is deposited upon the dish, a pressing roller mounted on said carriage, gear means on said roller, and a rack coacting with said gear means whereby said roller is actuated by the reciprocating movements of said carriage.

5. In a machine of the class described, a plate conveyor, a table mounted to reciprocate above the conveyor, means for feeding sheets of dough to said table, means acting to retain the sheet of dough as the table is retracted, whereby it is deposited upon a plate on the conveyor, and a driven pressing roller mounted to reciprocate with said table.

6. The combination with a dish conveyor, of an inclined table mounted to reciprocate in a plane above said conveyor, means for feeding sheets of dough to said table, means acting to retain the sheet of dough as the table is retracted, whereby it is deposited upon a plate on the conveyor, and a driven pressing roller mounted to reciprocate with said table.

7. The combination with a dish conveyor, of a feed table mounted to reciprocate above said conveyor for carrying a sheet of dough, and means acting to retain the sheet of dough as the table is retracted whereby it is deposited upon the dish.

8. The combination with a dish conveyor, of a feed table mounted to reciprocate in a plane above said conveyor for carrying a sheet of dough, means acting to retain the sheet of dough as the table is retracted whereby it is deposited upon the dish, and a driven pressing roller mounted to reciprocate with said table.

9. In a machine of the class described, the combination with a conveyor for carrying a dish, of a carriage mounted to reciprocate transversely of said conveyor and provided with a table, means disposed at the side of the conveyor adapted to retain the sheet of dough as the table is retracted whereby it is deposited upon the dish, and a pressing roller mounted on said carriage.

10. In a machine of the class described, an inclined table having a diagonal tilting axle, a plate pivoted to the face of said table, means for tilting said table, and means acting to swing said plate upwardly away from said table on the tilting thereof.

11. In a machine of the class described, in combination, a feed means for lumps of dough, a dough lump release in association with said means for delivering said lumps one at a time, lump flattening rolls for receiving the lumps as they are supplied by said release, an inclined table pivoted for receiving the flattened dough lumps from said rolls and discharging them transversely when tilted about its pivotal axis, dough flattening rolls for receiving the flattened lumps from said table, an upper conveyor acting to receive the sheets of dough as they are discharged by said last named flattening rolls, a lower conveyor, means for receiving the sheets from said upper conveyor and discharging the same in a turned-over position on the lower conveyor, and an inclined plate mounted for reciprocatory movement and acting to receive the dough sheets one at a time as they are discharged by said lower conveyor to discharge the sheet.

12. In a machine of the class described, in combination, a feed means for lumps of dough, a dough lump release in association with said means for delivering said lumps one at a time, lump flattening rolls for receiving the lumps as they are supplied by said release for partially flattening the same, an inclined table having a stop at its lower edge and pivoted at diagonally opposite corners for receiving the flattened dough lumps from said rolls and discharging them transversely when tilted about its pivotal axis, dough flattening rolls for receiving the partially flattened dough lumps from said table, a conveyor means acting to receive the sheets of dough as they are discharged by said last named flattening rolls, an inclined plate mounted for horizontal reciprocatory movement and acting to receive the dough sheets one at a time as they are discharged by said conveyor means.

13. In a machine of the class described, in combination, a pair of dough flattening rolls, feeding means for delivering pieces of dough to said rolls in timed sequence one at a time, a second pair of dough flattening rolls arranged below and at right angles to said first named rolls, a transfer table inclined relative to said first named rolls for receiving the dough therefrom by gravity, said table having an adjustable stop thereon, pivot means supporting said table at diagonally opposite corners, whereby the tilting thereof inclines the table toward said second rolls causing the dough to be delivered thereto by gravity, and means for actuating said feeding means and tilting said table in synchronism with each other, the weight of said stop acting to return said table to its initial position on the release of the tilting force.

14. In a machine of the class described, in combination, a reciprocatory carriage having an inclined member and a roll journaled thereto, means for rotating the roll on the reciprocation of said carriage, means for successively delivering a sheet of dough to said member during each advance stroke thereof, said member moving over receptacles successively positioned under said member, whereby a sheet of dough is adapted to be laid on one of said receptacles by the retraction of said member, means for preventing the retraction of the sheet with the carriage, the roll acting during the retracting stroke of said carriage to press the sheet into said receptacle, said roll having a raised portion coacting with the interior of the receptacle to conform the sheet to the shape of the receptacle.

15. In a machine of the class described, in combination, a reciprocatory carriage having an inclined member and a roll journaled thereto, means for rotating the roll on the reciprocation of said carriage, means for successively delivering a sheet of dough to said member during each advance stroke thereof, said member moving over receptacles successively positioned under said member, whereby a sheet of dough is adapted to be laid on one of said receptacles by the retraction of said member, means engaging the front edge of said sheet during the retraction of the carriage for preventing the retraction of the sheet with the carriage, the roll acting during the retracting stroke of said carriage to press the sheet into said receptacle.

16. In a machine of the class described, an inclined table mounted to reciprocate in a horizontal direction, means for reciprocating said table, means for delivering dough blanks to said table, a marker coacting with said table for impressing each dough blank with an identification, the dough blank being discharged from said table on the retraction thereof, and means for actuating said marker in timed relation with the reciprocation of said table.

17. In a machine of the class described, an inclined table, means for feeding sheets of dough thereto, a plate pivoted to the face of the table, and means for swinging the plate upwardly from the table.

18. In a machine of the class described, an inclined table movable about an inclined axis, and having a stop at one side raised from the plane of the table, said stop being at the lower portion of the table when the table is in one inclined position, and at the lateral side when the table is moved about its axis.

19. In a machine of the class described, a conveyor for conveying sheets of flattened dough, a second conveyor, means for inverting the sheets of dough and directing them onto the second conveyor, and a pair of revoluble cylindrical brushes, one in connection with each of the conveyors for removing the loose flour from the upper sides of the sheets of dough on the respective conveyors, each brush being mounted on an axis transverse to the direction of movement of the respective conveyor and rotatable in a direction opposite to said conveyor.

20. In a machine of the class described, a pair of dough flattening rolls, a second pair of dough flattening rolls arranged below and at right angles to the first named rolls, a transfer table inclined relative to said first named rolls for receiving dough therefrom by gravity, and pivot means for supporting said table whereby the same is tiltable from said first named position to a position in which the table is inclined downwardly toward said second rolls, causing the dough to be delivered to the latter rolls by gravity.

21. In a machine of the class described, a pair of dough flattening rolls, feeding means for delivering pieces of dough to said rolls, a second pair of dough flattening rolls arranged below and at right angles to the first named rolls, a transfer table inclined relative to said first named rolls, for receiving dough therefrom by gravity, and pivot means for supporting said table whereby the same is tiltable from said first named position to a position in which the table is inclined downwardly toward said second rolls, causing the dough to be delivered to the latter rolls by gravity.

22. In a machine of the class described, in combination, a reciprocatory carriage having an inclined member and a roll journaled thereto, means for rotating the roll on the reciprocation of said carriage, means for successively delivering a sheet of dough to said member at each stroke thereof in one direction, said member moving over receptacles successively positioned under said member whereby a sheet of dough is adapted to be laid on one of said receptacles by the retraction of said member in the opposite direction, and means for preventing the retraction of the sheet with the carriage, the roll acting to press the sheet into said receptacle.

23. In a machine of the class described, in combination, a reciprocatory carriage having an inclined member and a roll journaled thereto, means for rotating the roll on the reciprocation of said carriage, means for delivering a sheet of dough to said member at each stroke thereof in one direction, said carriage moving over receptacles successively positioned under said member, said receptacles having dough bottoms therein, whereby a sheet of dough is adapted to be laid on one of said receptacles by the movement of said member, the roll acting to trim and press the edge of the sheet into engagement with the dough bottom.

24. In a machine of the class described, in combination, a reciprocatory carriage, a roll journaled thereto, means for delivering a sheet of dough to said carriage at each stroke thereof in one direction, said carriage moving over receptacles successively positioned under said carriage whereby a sheet of dough is adapted to be laid on one of said receptacles, the roll acting during the retract stroke of the carriage to trim and press the edge of the sheet with respect to the plate, and means for preventing sliding and tipping of the plate during the dough laying, trimming, and pressing operation.

IRVIN F. McDONALD.